United States Patent
Ryoo

(10) Patent No.: US 6,526,345 B2
(45) Date of Patent: Feb. 25, 2003

(54) METHOD AND SYSTEM FOR CONTROLLING A VEHICLE SPEED

(75) Inventor: Nam-Kyoo Ryoo, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/027,360

(22) Filed: Dec. 19, 2001

(65) Prior Publication Data

US 2002/0087254 A1 Jul. 4, 2002

(30) Foreign Application Priority Data

Dec. 30, 2000 (KR) .......................................... 2000-86912

(51) Int. Cl.[7] ................................................. G06F 7/00
(52) U.S. Cl. ...................................................... 701/93
(58) Field of Search ............................. 701/93, 96, 23; 180/167, 168, 169, 170, 171

(56) References Cited

U.S. PATENT DOCUMENTS 6,049,749 A * 4/2000 Kobayashi .................. 701/49

* cited by examiner

Primary Examiner—Yonel Beaulieu
(74) Attorney, Agent, or Firm—Pennie & Edmonds LLP

(57) ABSTRACT

An appropriate speed of a vehicle for an approaching road curve is calculated on the basis of the curvature of and distance to the road curve, and subsequently an arrival time interval for the vehicle at a current speed to arrive at the road curve and a deceleration time interval for the current vehicle speed to be reduced to the appropriate speed are calculated if the current vehicle speed is higher than the appropriate speed. If the current vehicle speed is still higher than the appropriate speed when the arrival time interval, varying according to the vehicle's running, becomes equal to the deceleration time interval, the vehicle speed in forcibly reduced to the appropriate speed.

11 Claims, 2 Drawing Sheets

METHOD AND SYSTEM FOR CONTROLLING A VEHICLE SPEED

BACKGROUND OF THE INVENTION

The present invention relates to a method and system for controlling vehicle speed, and more particularly, to a method and system for controlling vehicle speed wherein information about approaching road curves is detected and then the vehicle speed is regulated to a certain level for ensuring safety.

As is well known in the art, the tendency of recent design and development of the automobile or vehicle has been changed from developing an automobile that is normally passively operated by the driver to developing an automobile capable of active control with regard to road conditions in which it operates.

Typical examples of such developments are an anti-lock brake system (ABS), a traction control system (TCS) and a Cruise Control system, which initially obtain information about road conditions and then control themselves to cause the automobile equipped with these systems to be appropriately operated under the road conditions. For example, development of a system is underway in which a vehicle is equipped with a radar for measuring a distance from a vehicle running ahead thereof and whereby at least a minimum distance is maintained, which is normally referred to as an Intelligent Cruise Control System (Hereunder, referred to "ICC system").

One example of maintaining at least the minimum distance in the ICC system is to set a time interval that it would take for the vehicle equipped with the ICC system to arrive at a position of a leading vehicle, in a case where the leading vehicle is suddenly stopped due to an emergency situation, e.g., a collision. By using the time interval, the vehicle can be controlled in such a way that it is not allowed to be closer to the leading vehicle at a distance smaller than a distance calculated by using the time interval and speed of the leading vehicle, even though the vehicle equipped with the ICC system is set to a cruising speed faster than that of the leading vehicle.

For example, provided that the leading vehicle runs at a speed of 100 km/h and the time interval is set to 3 seconds, even though the cruising speed of the vehicle equipped with the ICC system is set to a speed greater than 100 km/h, the latter is forced to run at a speed of 100 km/h, maintaining the distance from the leading vehicle at about 83 m as a minimum value.

The automatic maintenance of at least the minimum distance from the leading vehicle removes discomfort that the driver feels from frequent changes of the set speed of the Cruise Control System due to speed changes of the leading vehicle, while allowing the driver to have enough time to react against an emergency situation caused by the leading vehicle.

Although the prior art speed control system constructed in this manner can perform its assigned task, a need has continued to exist for an enhanced speed control system capable of ensuring a safe running state of the vehicle, even when the vehicle runs on a curved road. Although the prior art speed control system can force the vehicle equipped with the Cruise Control System to not run faster than the leading vehicle on the curved road, this does not provide full safety of the vehicle in a case that there's no vehicle running ahead.

Further, development of an intelligent transit system has become an important project in many countries, wherein a road information provider (normally referred to as a "Beacon") may be mounted on one side of the road for providing information about the road. The road information provider may provide information about the inclination of a road, the curvature of a curved section of the road and the distance between the vehicle and the road curve, as well as the road conditions.

SUMMARY OF THE INVENTION

The present invention provides a system for controlling a vehicle speed comprising: a target speed input section for an input of a determined target speed of a vehicle; a detection section for detecting a running state of the vehicle by using a plurality of sensors for detecting the running state of the vehicle; an actuator section for controlling the running state of the vehicle; a controller for controlling a speed of the vehicle by receiving information about the road from a road information provider that is mounted on either side of the road for provision of road information, in such a manner as to perform an inventive vehicle speed control method to be described herein; and a display section for displaying the information input to the controller, to a driver.

Further, the present invention provides a method for controlling a speed of a vehicle comprising: (a) receiving data about a curvature of a road curve and a distance to the road curve, and calculating an appropriate speed of the vehicle at the road curve; (b) determining whether a current speed of the vehicle is higher than the appropriate speed, and calculating an arrival time interval that it will take for the vehicle running at the current speed to arrive at the road curve if it is determined that the current speed of the vehicle is higher than the appropriate speed; (c) calculating a deceleration time interval that it will take for the current speed of the vehicle to be decelerated to the appropriate speed; and (d) determining, at the time when the arrival time interval which varies according to an advancement of the vehicle becomes equal to the deceleration time interval, whether the current speed of the vehicle is equal to or smaller than the appropriate speed, and forcibly decelerating the vehicle under predetermined deceleration to the appropriate speed if it is not.

Preferably, the inventive method further comprises calculating a warning time by adding a predetermined marginal time interval to the deceleration time interval, determining whether the arrival time interval is larger than the warning time and emitting signals suggesting deceleration of the vehicle at the time when the arrival time interval becomes equal to the warning time in a case that the arrival time interval is larger than the warning time.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

A preferred embodiment of the present invention will hereinafter be described in detail with reference to the accompanying drawings.

Figure 1:
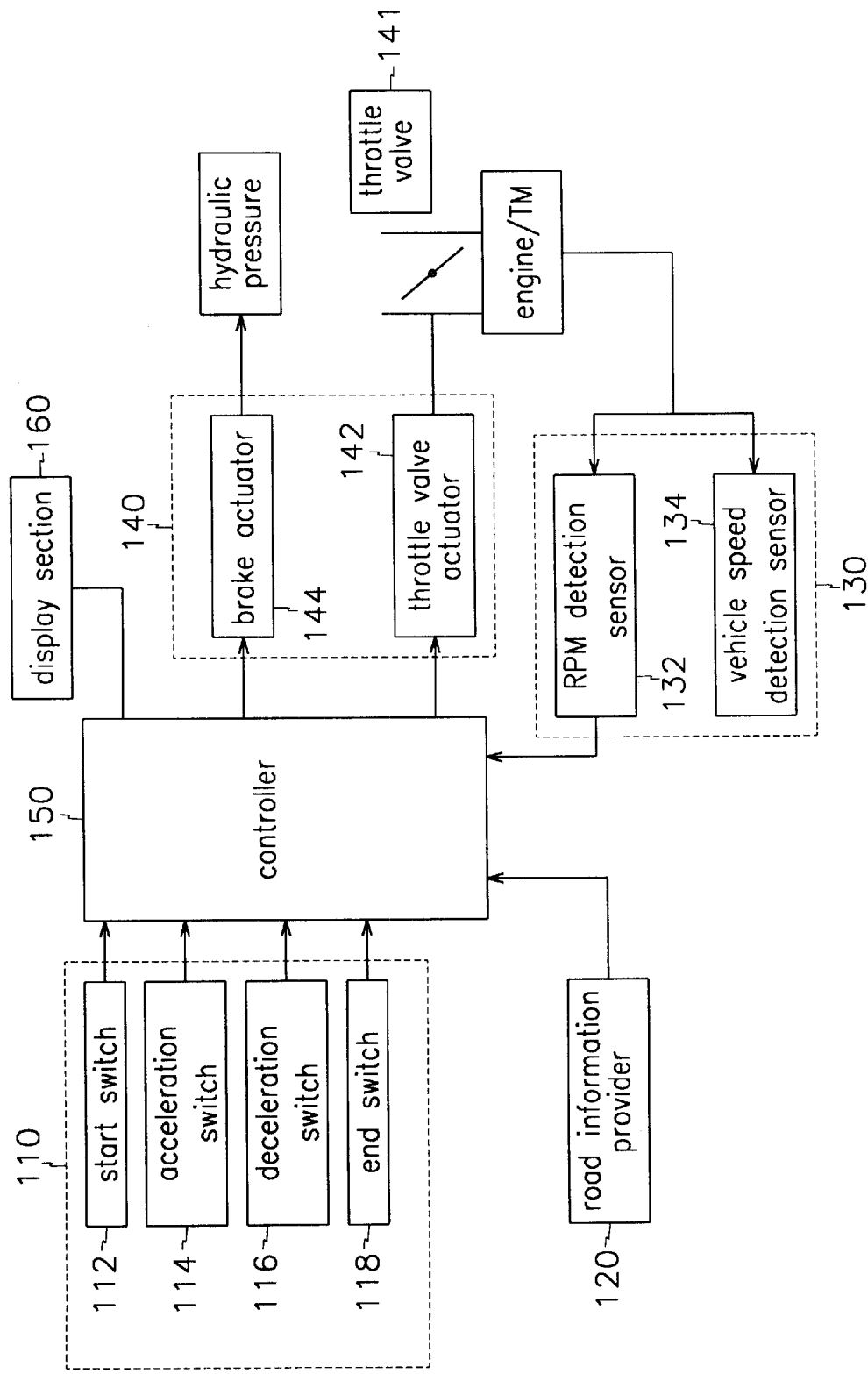
FIG. 1 is a block diagram of a system for controlling a vehicle speed in accordance with one embodiment of the present invention.

As shown in FIG. 1, a system for controlling a vehicle speed in accordance with one embodiment of the present invention includes a target speed input section 110 for an input of a determined target speed of a vehicle; a detection section 130 for detecting a running state of the vehicle by using a plurality of sensors; an actuator section 140 for controlling the running state of the vehicle; a controller 150 for controlling a speed of the vehicle by receiving information about an approaching road curve from a road information provider 120 that is mounted on either side of the road, in such a manner so as to perform an inventive vehicle speed control method to be described herein; and a display section 160 for displaying the information input to the controller 150, to a driver.

The speed input section 110 may include a plurality of switches including a start switch 112 for triggering speed control of the vehicle, an acceleration switch 114 for causing acceleration of the vehicle, a deceleration switch 116 for causing deceleration of the vehicle, and an end switch 118 for causing a termination of the speed control of the vehicle.

The detection section 130 is provided with a detection sensor 132 for detecting revolutions per minute (RPM) of the engine and a detection sensor 134 for detecting the speed of the moving vehicle.

The actuator section 140 includes a throttle valve actuator 142 actuating throttle valve 141 in response to control signals from the controller 150, and a brake actuator 144 generating a hydraulic pressure for a braking action in response to control signals from the controller 150.

It is preferable that a step motor be used as the throttle valve actuator 142; and the brake actuator 144 may be of the same configuration as that of conventional hydraulic mechanisms such that it actuates the brake system by generating hydraulic pressure on a brake line or a brake master cylinder.

A general speaker system or a display device mounted within the driver's compartment of the vehicle may be used as the display section 160.

The controller 150 may be a microprocessor, and it is preferable that each of the steps in the inventive vehicle speed control method be performed by the microprocessor operation based on a computer program as may be devised by a person of ordinary skill in the art based on the teachings contained herein.

The controller 150 drives the brake actuator 144 to decelerate the vehicle, while driving the throttle valve actuator 142 provides for acceleration of the vehicle.

Figure 2:
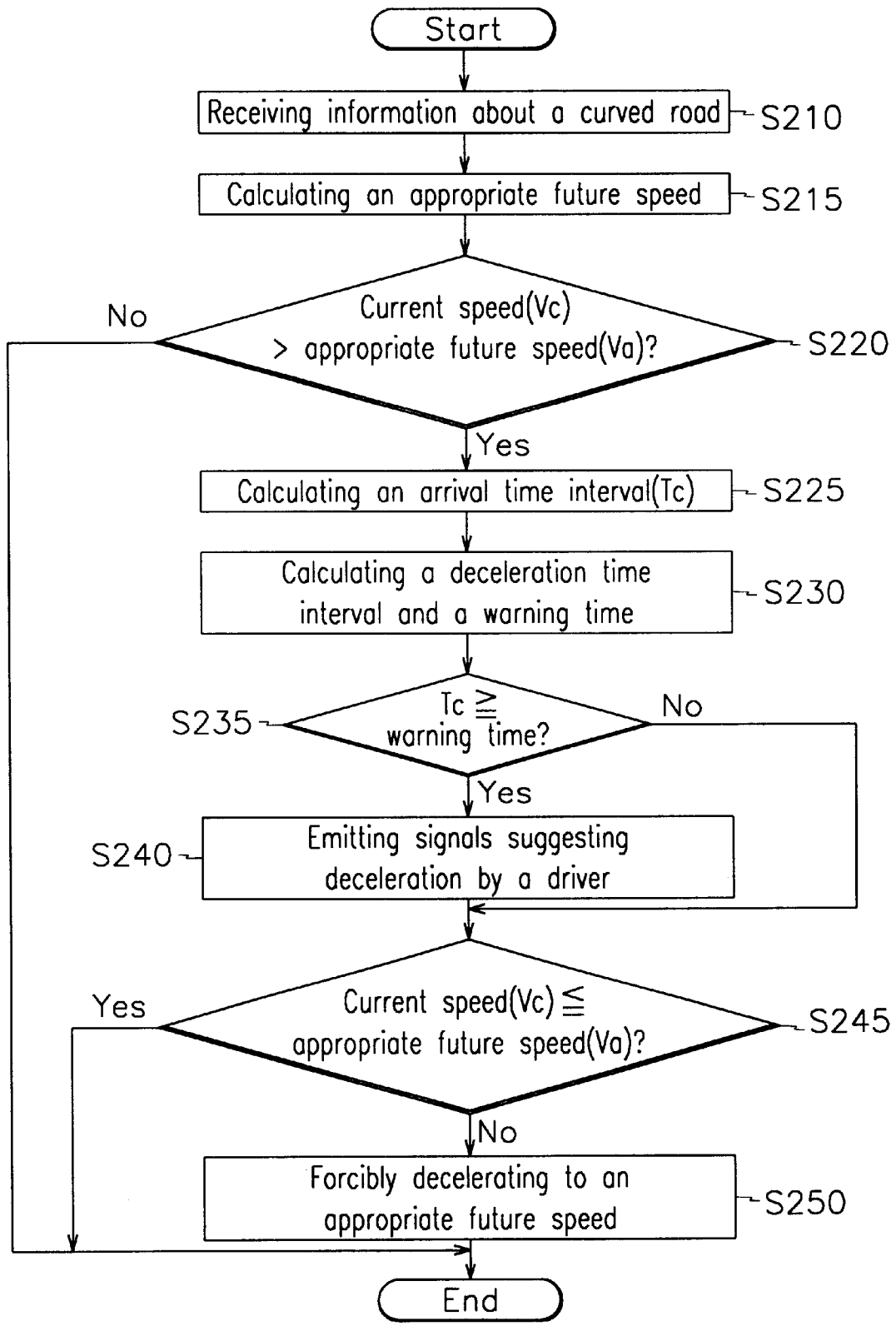
FIG. 2 is a flow chart showing a method for controlling a vehicle speed in accordance with one embodiment of the present invention.

As illustrated in FIG. 2, controller 150 receives data about the curvature or radius R of a road curve and the distance D between the vehicle and the road curve from the road information provider 120 (S210). A conventional radio beacon system may be used as the road information provider 120, and the data from the road information provider 120 may be transmitted via dedicated short-range communication (DSRC) to the controller 150.

The controller 150, having received the data about the radius R of the road curve and the distance D between the vehicle and the road curve, calculates an appropriate future speed Va of the vehicle for the time when it arrives at the road curve. The speed of the vehicle running at which the centrifugal force acting on the vehicle is optimized in view of the conditions of the vehicle and the road curve may be selected as the appropriate future speed Va of the vehicle.

After calculating the appropriate future speed Va, the controller 150 detects a current speed Vc of the vehicle and determines whether the current speed Vc exceeds the appropriate future speed Va (S220). In a case that the current speed Vc of the vehicle is equal to or lower than the appropriate future speed Va of the vehicle, the control of the vehicle speed is terminated. In a case that the current speed Vc of the vehicle exceeds the appropriate future speed Va of the vehicle, the arrival time interval Tc that it will take for the vehicle running at the current speed Vc to arrive at the curved section of the road is calculated (S225). The arrival time interval Tc may be obtained by dividing the distance D between the vehicle and the road curve by the current speed Vc of the vehicle.

Next, the deceleration time interval that it takes for the vehicle running at the current speed Vc to be decelerated to the appropriate future speed Va, and a warning time at which signals suggesting to a driver to decelerate the vehicle start to be emitted, are calculated (S230). The deceleration time interval may be obtained using a predetermined deceleration that can be determined based on the conditions of the vehicle and the road curve. Such a deceleration value may be properly selected from various values that do not cause the driver to feel uneasy or have any problems with the vehicle under deceleration. Such values may be readily determined by persons skilled in the art.

Dividing the difference between the current speed Vc and the appropriate future speed Va of the vehicle by the predetermined deceleration provides the deceleration time interval. The warning time may be calculated by adding a predetermined marginal time interval to the deceleration time interval. For example, a time that it will take for the driver to voluntarily complete the deceleration of the vehicle after he perceives the signals suggesting the deceleration may be set as the predetermined marginal time.

Next, the controller 150 determines whether the arrival time interval Tc is larger than the warning time (S235). In a case that the arrival time interval Tc is larger than the warning time, the signals suggesting the deceleration of the vehicle are emitted at the warning time, i.e., at the time when the arrival time interval Tc which varies according to the advancement of the vehicle becomes equal to the warning time (S240).

The emission of the signals suggesting the deceleration may be carried out through any means such as audio signals by the speaker mounted in the vehicle, or video signals by the display device.

In a case that the arrival time interval Tc is smaller than the warning time interval in the step S235, or in a case that once the signals suggesting the deceleration have been emitted at the warning time, it is determined whether the current vehicle speed Vc is decelerated to a speed equal to or smaller than the appropriate future speed Va (S245).

The determination in the step S245 is carried out at the time when the arrival time interval Tc, which varies according to the advancement of the vehicle, becomes equal to the deceleration time interval.

In a case that the current vehicle speed has been decelerated to the speed equal to or smaller than the appropriate future speed Va in the step S245, the speed control process is terminated. In a case that the current vehicle speed Vc is not changed to the speed equal to or smaller than the appropriate future speed Va in the step S245, a forced deceleration is performed under the predetermined deceleration (S250). The brake actuator 144 and the controller 150 operating the brake actuator 144 may carry out the forced speed reduction.

In accordance with the preferred embodiment of the present invention, the vehicle speed can be automatically reduced to a safer speed before the vehicle enters the road curve, reducing the possibility of an accident that may occur when the driver unconsciously enters the road curve at a dangerous speed.

While this invention has been described in connection with what is presently considered to be a practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a speed of a vehicle comprising:
   (a) receiving data about a curvature of a road curve and a distance to the road curve, and calculating an appropriate speed of the vehicle at the road curve;
   (b) determining whether a current speed of the vehicle is higher than the appropriate speed, and calculating an arrival time interval that it will take for the vehicle running at the current speed to arrive at the road curve if it is determined that the current speed of the vehicle is higher than the appropriate speed;
   (c) calculating a deceleration time interval that it will take for the current speed of the vehicle to be decelerated to the appropriate speed; and
   (d) determining whether the current speed of the vehicle is equal to or smaller than the appropriate speed, and forcibly decelerating the vehicle to the appropriate speed if it is not.

2. The method of claim 1, further comprising calculating a warning time by adding a predetermined marginal time interval to the deceleration time interval.

3. The method of claim 2, further comprising generating a warning signal by determining whether the arrival time interval is larger than the warning time and emitting a warning signal when the arrival time interval becomes equal to the warning time.

4. A system for controlling a vehicle speed, comprising:
   a detection array adapted to determine a running state of the vehicle by using a plurality of sensors adapted to detect the running state of the vehicle;
   an actuator adapted to control the running state of the vehicle;
   a vehicle speed controller adapted to receive information about a road curve from a road information provider and being programmed to execute a vehicle speed control method including:
   (a) receiving data about a curvature of the road curve and a distance to the road curve, and calculating an appropriate speed of the vehicle at the road curve;
   (b) determining whether a current speed of the vehicle is higher than the appropriate speed, and calculating an arrival time interval that it will take for the vehicle running at the current speed to arrive at the road curve if it is determined that the current speed of the vehicle is higher than the appropriate speed;
   (c) calculating a deceleration time interval that it will take for the current speed of the vehicle to be decelerated to the appropriate speed; and
   (d) determining whether the current speed of the vehicle is equal to or smaller than the appropriate speed, and forcibly decelerating the vehicle to the appropriate speed; and a display adapted to display the information input to the controller.

5. The system for controlling a vehicle speed of claim 4, wherein said vehicle speed control method executed by the controller further includes calculating a warning time by adding a predetermined marginal time interval to the deceleration time interval.

6. The system for controlling a vehicle speed of claim 5, wherein said vehicle speed control method executed by the controller further includes generating a warning signal by determining whether the arrival time interval is larger than the warning time and emitting a warning signal when the arrival time interval becomes equal to the warning time.

7. The system of claim 4, wherein said actuator includes a throttle valve actuator actuating a throttle valve in response to control signals from the controller and a brake actuator generating a hydraulic pressure for a braking action in response to control signals from the controller, the controller operating the brake actuator in order to decelerate the vehicle and the throttle valve actuator in order to accelerate the vehicle.

8. The system for controlling a vehicle speed of claim 4, further comprising a target speed input section adapted to receive input of a determined target speed of the vehicle.

9. A method for controlling a speed of a vehicle, comprising:
   (a) receiving information regarding oncoming road and calculating an appropriate speed of the vehicle for said oncoming road;
   (b) determining whether a current speed of the vehicle is higher than the appropriate speed, and calculating an arrival time interval that it will take for the vehicle running at the current speed to arrive at said oncoming road if it is determined that the current speed of the vehicle is higher than the appropriate speed;
   (c) calculating a deceleration time interval that it will take for the current speed of the vehicle to be decelerated to the appropriate speed; and
   (d) determining whether the current speed of the vehicle is equal to or smaller than the appropriate speed, and forcibly decelerating the vehicle to the appropriate speed if it is not.

10. A system for controlling a vehicle speed comprising:
    a detection array adapted to determine a running state of the vehicle by using a plurality of sensors adapted to detect the running state of the vehicle;
    an actuator adapted to control the running state of the vehicle;
    a vehicle speed controller adapted to receive information about oncoming road from a road information provider, said controller programmed to:
    (a) receive information regarding oncoming road and calculate an appropriate speed of the vehicle for said oncoming road;
    (b) determine whether a current speed of the vehicle is higher than the appropriate speed, and calculate an arrival time interval that it will take for the vehicle running at the current speed to arrive at said oncoming road if it is determined that the current speed of the vehicle is higher than the appropriate speed;
    (c) calculate a deceleration time interval that it will take for the current speed of the vehicle to be decelerated to the appropriate speed; and
    (d) determine whether the current speed of the vehicle is equal to or smaller than the appropriate speed, and forcibly decelerate the vehicle to the appropriate speed if it is not.

11. The system for controlling a vehicle speed of claim 10, further comprising a target speed input section adapted to receive input of a determined target speed of a vehicle.

* * * * *